May 13, 1958 R. J. GORSKY 2,834,445
SPRAG CLUTCH
Filed Sept. 20, 1955

INVENTOR.
Rudolph J. Gorsky
BY
L. D. Burch
ATTORNEY

United States Patent Office 2,834,445
Patented May 13, 1958

2,834,445

SPRAG CLUTCH

Rudolph J. Gorsky, Fenton, Mich., assignor to General Motors Corporation, Detroit, Mich., a corporation of Delaware Application September 20, 1955, Serial No. 535,442

2 Claims. (Cl. 192—45.1)

The present invention relates to sprag clutches and more particularly to a sprag clutch having means for retaining inner and outer cylindrical races substantially concentric with each other at all times.

In one form of one-way clutch, a plurality of substantially identical sprags or tiltable grippers are disposed between relatively rotatable inner and outer races having substantially concentric surfaces. These sprags are so dimensioned and positioned between the two races that when the two races are relatively rotated in one direction, the ends of the sprags will merely slide on the cylindrical surfaces and allow one race to overrun the other race. However, when the races rotate relatively in the opposite direction, the ends of the sprags will wedge against the races and thereby transmit torque from one race to the other. Although these sprags are capable of transmitting torque from one race to the other, they are unable to withstand a radial thrust between the races that causes them to become eccentric to each other. Therefore, it has been necessary heretofore to provide separate bearing means for retaining the races concentric in order to insure proper operation of the clutch. Although separate bearings will help in retaining the races concentric, since the bearings are necessarily remote from the races, the race members frequently have sufficient resilience to allow them to be deflected enough to at least impair the high speed response thereof. In addition, there are some installations such as in a fluid type torque converter, etc. where it is impossible to provide a bearing that will support both races.

Accordingly, numerous attempts have been made to provide a sprag clutch capable of withstanding radial loads and retaining the races concentric. These attempts have included slipper bearings, interspersing balls and/or rollers, etc. between the sprags and sprag cages that form a part of the bearing structure. However, these attempts have frequently produced structures in which the capacity of the clutch has been drastically reduced and/or stresses in some parts became so excessive that the clutches broke prematurely. In addition, when a common portion of the races form both the clutching surface and the bearing surface, the clutches frequently become noisy in operation.

It is now proposed to provide a sprag clutch which will be capable of maintaining the inner and outer races substantially concentric and at the same time will have a high capacity and be silent in operation. This is to be accomplished by providing an assembly of sprags between a pair of substantially cylindrical races and with a pair of washer shaped bearing elements positioned adjacent the opposite ends of the sprags. Each of the bearing elements include bearing surfaces that slidably engage the inner and outer races and thus support a radial load. The bearing elements are preferably as thin as possible and immediately adjacent the ends of the sprags so as not to materially increase the length thereof. Each of the bearing surfaces may include one or more recessed portions that will allow the lubricant to flow therethrough and thus insure a film of lubricant between the working surfaces as well as remove any foreign particles from between the races. The bearing elements are detached from the sprags and/or any cage structure, if present to allow relative movement therebetween. Thus there will be no tendnecy for the bearing elements to force the sprags or cage, if any, to move, and interfere with the clutching action thereof.

Figure 1:
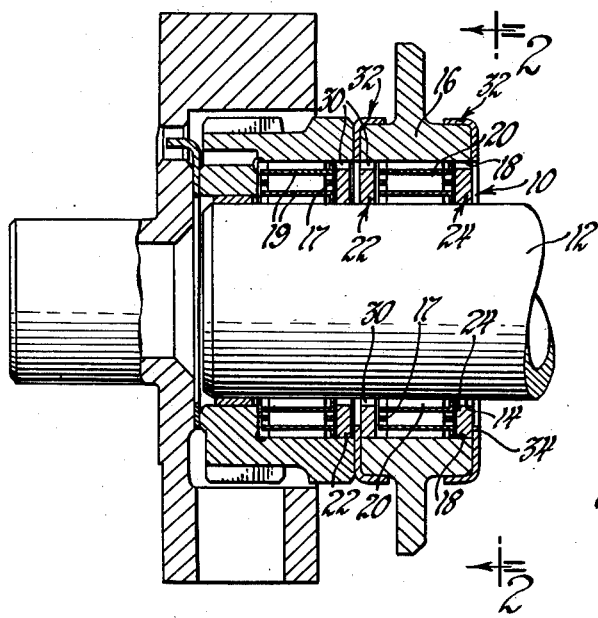
Figure 1 is a cross sectional view of a sprag clutch embodying the present invention.
Figure 2:
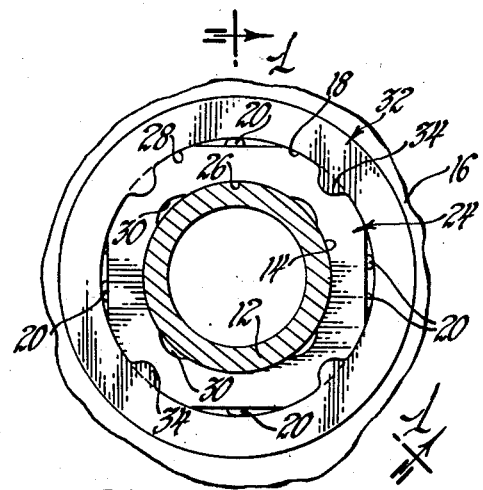
Figure 2 is a side view of one of the bearing elements employed in the clutch in Figure 1.
Figure 3:
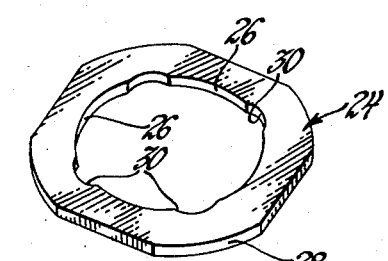
Figure 3 is a perspective view showing one of the bearing elements.

Referring to the drawings in more detail, the present invention may be embodied in any suitable one-way clutch 10. In the present instance this clutch 10 is a so-called sprag clutch adapted to be disposed between a member 12 having a substantially cylindrical inner race 14 and a member 16 having a substantially cylindrical outer race 18 that are disposed in spaced, substantially concentric relation. This clutch 10 includes a plurality of substantially identical tiltable grippers or sprags 20 that are circumferentially disposed around the space between the inner and outer races 14 and 18. Each of the sprags 20 is disposed in a spiral or nearly radial position about the axis of rotation with the inner and outer ends of the sprags 20 engaging the races. These ends of the sprags 20 form cam surfaces which are disposed so that one diagonal of the sprags 20 in one direction is longer than the diagonal in the other direction and is also longer than the space between the two races 14 and 18 so that they may wedge therebetween. Any suitable biasing means such as springs 17 and/or cages 19 may be provided for holding the sprags in engagement with the races 14 and 18 at all times. Thus when the outer race 18 rotates in one direction relative to the inner race 14, the cam surfaces will merely slide on the races and in no way interfere with the relative rotation therebetween. However, when the outer race 18 rotates in the opposite direction, the frictional engagement between the ends of the sprags 20 and the races 14 and 18 and the biasing means, if present, will cause the sprags 20 to become wedged between the inner and outer races 14 and 18. Continued movement of the races in this direction will cause the sprags 20 to transfer a driving torque from one race to the other and produce a simultaneous rotation thereof.

In a clutch 10 of this nature the position of the sprags 20 is not fixed by any rigid means but merely by the biasing action thereon and in view of this, it is apparent that these sprags 20 will not necessarily tend to maintain the two races 14 and 18 concentric with each other at all times. Accordingly, a bearing element 22 and 24 may be disposed adjacent each of the ends of the sprags 20 and engage each of the races 14 and 18 to insure their being maintained concentric with each other.

The present bearing elements 22 and 24 are washer shaped or planar members having circular inner and outer surfaces 26 and 28 formed thereon. These inner surfaces 26 form bearing surfaces that are adapted to slide on the inner race 14 while the outer surfaces 28 form bearing surfaces that are adapted to slide on the outer race 18. Since these elements 22 and 24 are rigid members, it is apparent that they will be capable of withstanding a radial load and thus insuring that the races 14 and 18 are concentric. Although the bearing surfaces may be of sufficient size to adequately carry the load, where space is a limitation, they may be made thin in an axial direction to decrease the overall length of the clutch. By allowing relative movement between the bearing elements and the sprags, it will be seen that the bearing elements may move as required by the demands of the bearing load and at the same time, they will not affect the position of the sprags or the biasing forces thereon.

In the event that any foreign substances such as dirt, etc. should appear in the clutch assembly 10, they may become lodged between the sliding surfaces. Also it is highly desirable to insure an adequate film of lubricant between the sliding surface to prevent undue wearing thereof. Accordingly, the inner and outer bearing surfaces 26 and 28 of the bearing elements 22 and 24 are preferably relieved to form small notches 30 through which a lubricant such as oil may flow. As the lubricant circulates through these notches 30, a film of lubricant will be formed on the race surfaces. Moreover, if there are any particles of foreign matter between the sliding surfaces, they will work their way along the surfaces until they appear in the notches 30. The circulation of lubricant therethrough will then cause the foreign particles to be washed away instead of otherwise being permanently lodged between the surfaces. These notches 30 are preferably so small that the load will be spread over enough of the mating surfaces to prevent wearing thereof.

In order to prevent the bearing elements 22 and 24 becoming skew to the axis, clips 32 may be disposed on the outer member 12 so that tabs 34 will extend into the space between the races 14 and 18 and along the sides of the bearing elements 22 and 24.

It is to be understood that, although the invention has been described with specific reference to a particular embodiment thereof, it is not to be so limited since changes and alterations therein may be made which are within the full intended scope of this invention as defined by the appended claims.

I claim:

1. In a device of the class described, the combination of a member having a cylindrical inner race, a member having a cylindrical outer race disposed concentrically about said inner race to form an annular space therebetween, an array of sprags circumferentially spaced around said annular space with the opposite ends thereof engaging the axially central portions of said races for allowing said races to overrun in one direction of movement, a washer shaped bearing element disposed substantially normal to the axis of said races immediately adjacent each of the axially opposite ends of said sprags, each of said bearing elements including an inner and an outer bearing surface for slidably engaging said races adjacent the axially opposite ends thereof for maintaining said races substantially concentric, each of the bearing surfaces on said bearing elements including recessed portions disposed adjacent said races.

2. In a device of the class described, the combination of an inner member having a cylindrical inner race, an outer member having a cylindrical outer race disposed substantially concentrically about said inner race to form an annular space therebetween, an array of sprags disposed in said space between said races with the opposite ends thereof engaging said races, a pair of planar elements disposed adjacent the axially opposite ends of said sprags substantially normal to the axis of said races, each of said elements including bearing surfaces for slidably engaging the axially opposite ends of said races for maintaining said races substantially concentric with each other, each of said bearing surfaces including recessed portions adapted to form lubricant pockets adjacent said races, retainer members on said outer member including radially inwardly projecting tabs that extend along the sides of said elements for retaining them substantially normal to said axis.

References Cited in the file of this patent

UNITED STATES PATENTS

| Number | Name | Date |
|---|---|---|
| 2,427,120 | Blair | Sept. 9, 1947 |
| 2,687,928 | Russey | Aug. 31, 1954 |
| 2,691,435 | Klamp | Oct. 12, 1954 |
| 2,724,472 | Swenson | Nov. 22, 1955 |